United States Patent [19]
Sheridan

[11] Patent Number: 5,628,231
[45] Date of Patent: May 13, 1997

[54] SIGHT GLASS CONSTRUCTION

[75] Inventor: Michael R. Sheridan, Morgan, N.J.

[73] Assignee: Ethylene Corp., Murray Hill, N.J.

[21] Appl. No.: 439,177

[22] Filed: May 11, 1995

[51] Int. Cl.$^6$ .................................................. G01F 23/02
[52] U.S. Cl. .............................. 73/323; 73/325; 73/328
[58] Field of Search ........................... 73/325, 326, 328, 73/330, 334, 324

[56] References Cited

U.S. PATENT DOCUMENTS

| | | | |
|---|---|---|---|
| 4,182,179 | 1/1980 | Meginnis | 73/330 |
| 4,862,907 | 9/1989 | Ledtje et al. | 137/512 |
| 4,888,990 | 12/1989 | Bryan et al. | 73/325 |
| 4,945,945 | 8/1990 | Schmid | 137/512 |
| 5,020,810 | 6/1991 | Jobe | 277/207 |
| 5,125,269 | 6/1992 | Horst, Jr. | 73/325 |
| 5,210,658 | 5/1993 | Foster | 73/330 |
| 5,241,986 | 9/1993 | Yie | 137/512 |

Primary Examiner—William A. Cuchlinski, Jr.
Assistant Examiner—Andrew Hirshfeld
Attorney, Agent, or Firm—Charles E. Temko

[57] ABSTRACT

An improved sight glass for use in determining the level of water in steam boilers and similar installations is disclosed. The end flanges are provided with molded inserts, preferably of PTFE or similar fluorocarbon material which serves to provide a sealing washer when the device is connected to communicating pipe flanges at an outer surface thereof, and provides a seal at the annular end surfaces of the sight glass. A concentrically disposed guard tube is also maintained in sealed relation relative to the end flanges, and is preferably of polycarbonate or similar material. The guard tube is supported by oppositely disposed rectangular cross-sectioned "O" rings which provide for the sealing of the cylindrically shaped space between the outer surface of the sight glass and the inner surface of the guard tube. Peripherally positioned tie rods prevent excess tightening of the end flanges, thus preventing excess axially oriented pressure on the sight glass.

7 Claims, 3 Drawing Sheets

SIGHT GLASS CONSTRUCTION

BACKGROUND OF THE INVENTION

This invention relates generally to the field of sight glasses, used to determine the level of fluid in a container without unsealing the container. Typical installations are upon steam boilers or hot water heaters to determine the level of water in the boiler. In such installations the water being measured is under considerable pressure, and the possibility of rupture of the sight glass and subsequent injury to a viewer is always present. It is known to provide a concentric shield having a relatively small slotted opening therein for viewing the tube. In the preferred type of shield, a transparent sleeve is provided which is sealed at the end portions thereof to provide an enclosed space between the sight glass and the shield.

In recent years, sight glasses have been employed in systems conducting corrosive or otherwise chemically active fluids as well as water. While the sight glass itself is relatively chemical inert, the remaining components are usually not, so that with continued use, deterioration occurs with the accompanying danger of leakage of such chemically active fluid.

SUMMARY OF THE INVENTION

Briefly stated, the invention contemplates the provision of an improved sight glass construction of the type described employing structure which substantially ameliorates the above-mentioned problems. To this end, the disclosed embodiment includes end flanges in which the centrally disposed through bores are fitted with a chemically inert material such as a fluorocarbon, the lining incorporating sealing means engaging the arcuate end surfaces of the sight glass. The same lining forms an annular seat for the engagement of the annular end surfaces of the guard tube using an "O" ring, the "O" ring forming a seal with the outer surface of the sight glass to provide an elongated sealed interstice which is not readily fogged by the ambient atmosphere.

BRIEF DESCRIPTION OF THE DRAWINGS

In the drawings, to which reference will be made in the specification similar reference characters have been employed to designate corresponding parts throughout the several views.

is a vertical central sectional view of a first embodiment of the invention as seen from the plane 1—1 in FIG. 2.

DETAILED DESCRIPTION OF THE DISCLOSED EMBODIMENT

Figure 1:
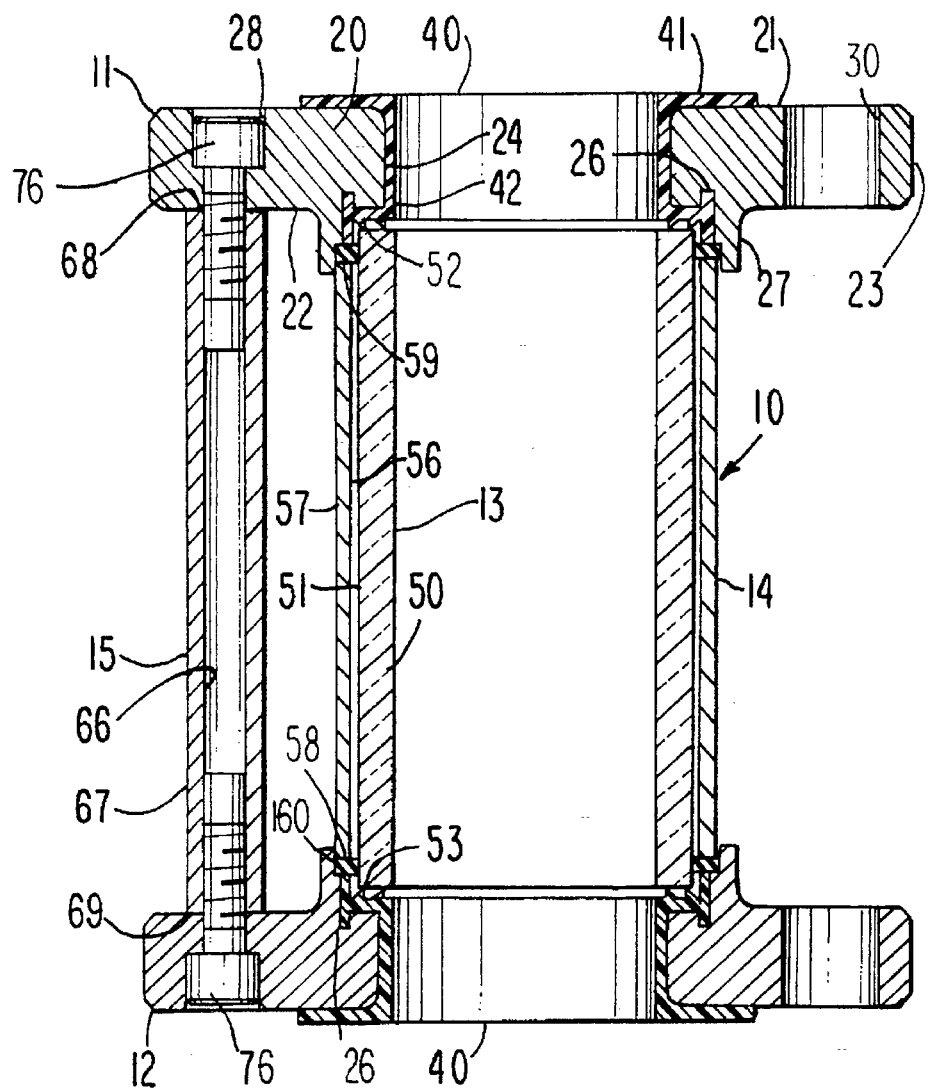
FIG. 1A is an enlarged fragmentary view of a lower left-hand portion of FIG. 1.
Figure 1A:
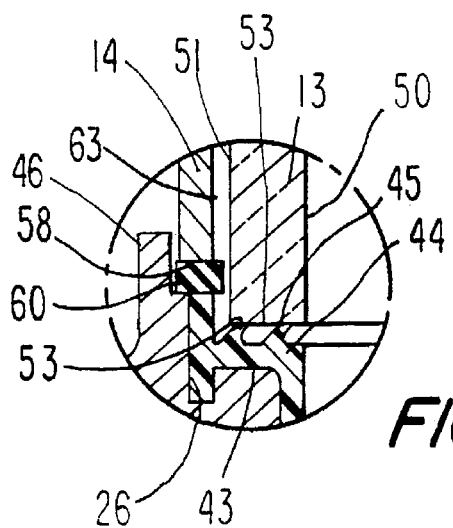
Figure 2:
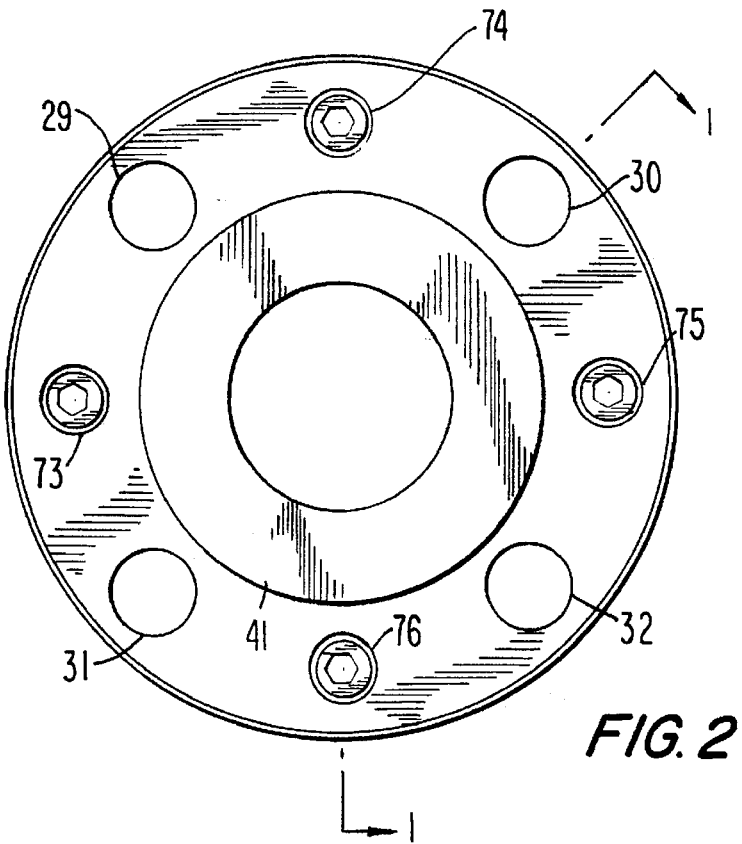
FIG. 2 is an end elevational view thereof.

In accordance with the first embodiment of the invention, the device, generally indicated by reference character 10, comprises broadly: first and second end flange elements 11 and 12, an inner tube member 13, an outer tube member 14, and a plurality of tie rods 15.

The first and second end flange elements 11 and 12 are substantially similar, and accordingly, a description of one such element will serve to describe the other. The element 11 includes a main body 20 of suitable metallic material, bounded by an outer surface 21, an inner surface 22, an outer peripheral surface 23 and an inner peripheral surface 24. The inner surface 22 defines an annular recess 26 adjacent an axially extending ring 27 forming a stepped recess 28.

The main body 20 is provided with four through bores 29, 30, 31, and 32 for engagement by threaded bolts (not shown) to enable the device to be interconnected to corresponding flanges of interconnecting pipes, as is known in the art. Spaced between the bores 29–32 are smaller counterbores 73, 74, 75, and 76 which are used to engage the tie rods 15.

Extending through the inner peripheral surface 24 which forms a centrally disposed bore is a molded liner 40 of chemically inert material, typically, a fluorocarbon such as polytetrafluoroethylene. The liner includes an outer radially extending portion 41, a first coaxially extending portion 42, and an inner radially extending portion 43 having an exposed surface 44 with sealing ribs 45 positioned to engage the ends of the inner tube member 13 in sealed relation. A second coaxially extending portion 46 extends to the stepped recess 28.

The inner tube member 13 is preferably formed of Pyrex or other tempered glass, and is bounded by an inner surface 50, an outer surface 51, as well as first and second end surfaces 52 and 53. The outer tube member 14 may be either of metal, or preferably, a transparent polycarbonate material. It is bounded by an inner surface 56, an outer surface 57, and end surfaces 58 and 59.

Seated in the stepped recess 28 is an "O" ring 60 having a rectangular cross-section which is adapted to contact both the outer surface 51 of the inner tube member 13 as well as one end surface 58-59 of the outer tube member 14, thus forming an enclosed interstice 63 which substantially eliminates the possibility of fogging between the inner and outer tube members when the device is in operation in a vapor laden ambient atmosphere.

The tie rods 15 are in the form of hollow metallic tubes each bounded by an inner surface 66, an outer surface 67, and end surfaces 68 and 69. The inner surface 66 forms a central bore the opposite ends of which are threaded to accommodate a recessed head bolt 78, which, when engaged, lies below the outer surfaces 21 of the main body 20, as best seen in FIG. 1.

Assembly of the device will be apparent from a consideration of FIG. 1, wherein it may be noted that since the inner tube member communicates directly with a liner 40 at each end thereof, corrosive or otherwise chemically active fluid passing through the device is inhibited from-contacting any of the corrosive metallic parts.

Figure 4:
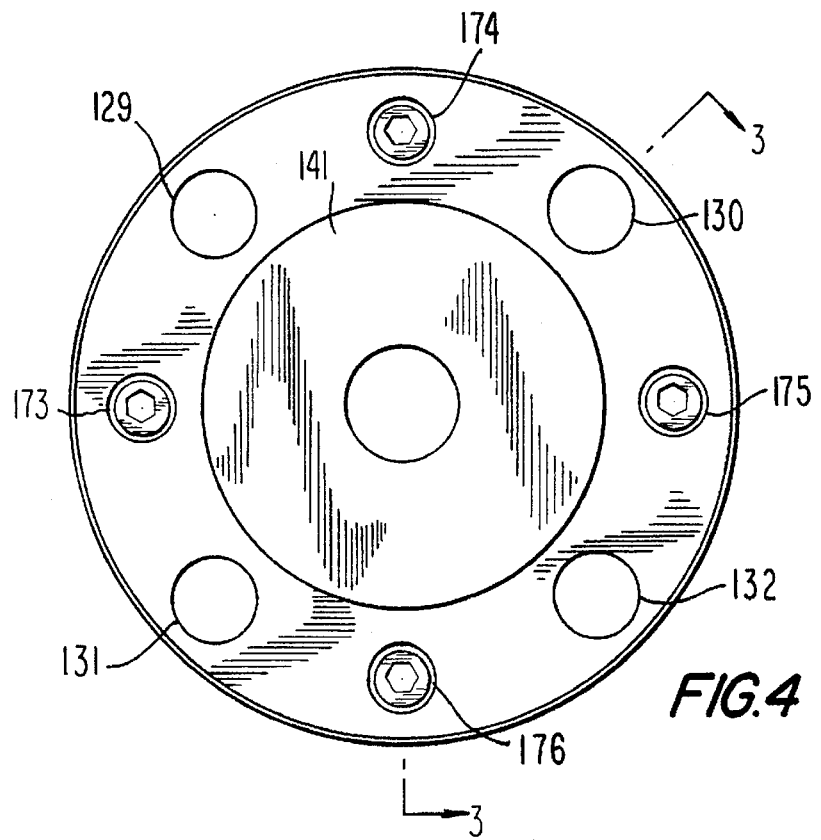
FIG. 4 is an end elevational view thereof.
Figure 3:
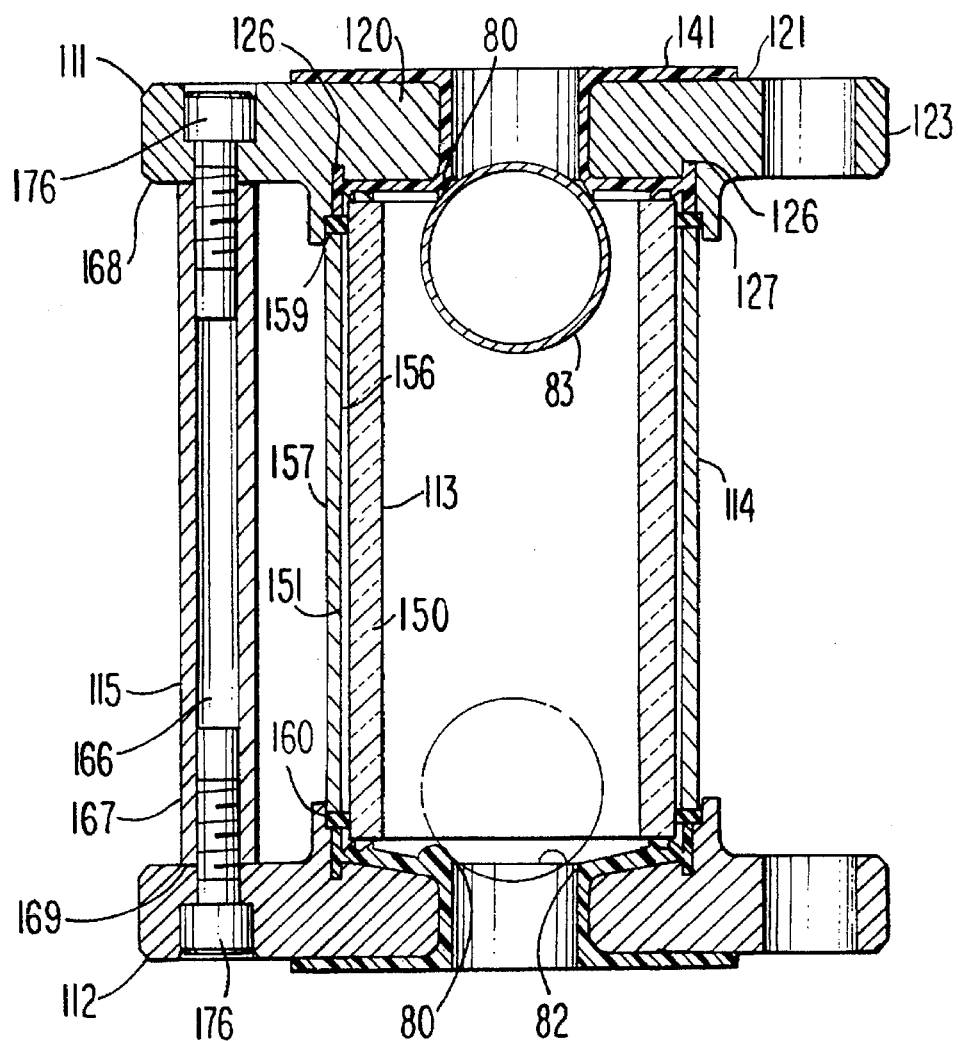
FIG. 3 is a vertical central sectional view of a second embodiment of the invention, as seen from the plane 3—3 in FIG. 4.
Figure 3A:
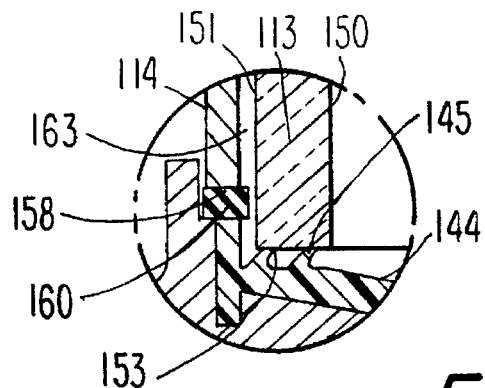
FIG. 3A is an enlarged fragmentary sectional view of a lower left-hand portion of FIG. 3.

Turning now to the second embodiment of the invention illustrated in FIGS. 3, 3A and 4 in the drawing, parts corresponding to those of the first embodiment have been designated by similar reference characters with the additional prefix "1".

The second embodiment differs from the first embodiment in the provision of an upper annular valve seat 80, and a lower annular valve seat 81 having a gap at 82 to allow upward flow past a hollow Teflon float 83 to a level which dislodges the float. This structure enables the device to be used as a check valve as well as a sight gauge.

I wish it to be understood that I do not consider the invention to lie in the specific details shown and described in the specification, for obvious modification will occur to those skilled in the art to which the invention pertains.

What is claimed is:

1. An improved sight glass construction comprising: first and second radially extending flange elements, each defining a central opening, and a plurality of radially arranged openings for reception of interconnecting bolts; said flange elements each defining an annular recess and a stepped recess; a transparent inner tube member engaging the annular recesses at each end thereof in sealed relation; an outer tube member surrounding said inner tube member and positioned within the stepped recesses at each end thereof in sealed relation to said first and second flange elements to define a cylindrical sealed interstice between said inner and outer tube members; and a plurality of tie rods interconnecting, said first and second flange elements in predetermined spaced relation, externally of said outer tube member.

2. An improved sight glass construction in accordance with claim 1, said flange elements each having a second plurality of through openings each of said second plurality of through openings having a counter bore; and bolt means engaging said second plurality of through openings and each of said tie rods.

3. An improved sight glass construction in accordance with claim 1, further comprising: an "O" ring positioned in each of the stepped recesses of said first and second flange elements, and engaging the ends of said outer tube.

4. An improved sight glass construction in accordance with claim 1, said flange elements each having inner and outer radially extending surfaces communicating with said central opening, and an insert molded liner member overlying said inner and outer surfaces and said central opening.

5. An improved sight glass construction in accordance with claim 4, in which said liner members each form a seal at the ends of said inner tube member.

6. An improved sight glass construction in accordance with claim 5, wherein for each of said flange elements, said liner member extends into said annular recess to form a seal at an one of the ends of said inner tube member.

7. A sight glass construction comprising: first and second end flange elements, a transparent tube member having first and second ends engaging said first and second end flange elements, and a plurality of tie rods positioned radially outwardly of said tube member and interconnecting said end flange elements in predetermined spaced relation; said end flange elements each forming a centrally positioned bore, and having a synthetic resinous liner extending through said bore and communicating with one of the ends of said tube member; an annular valve seat formed at an inner periphery of at least one of said liners, and a spherical float engageable with said valve seat to form a check valve at one of said ends of said transparent tube member.

* * * * *